June 24, 1947.  R. B. CARTER, JR  2,422,656

APPARATUS FOR EFFECTING CLARIFICATION OF TURBID LIQUIDS

Filed July 14, 1944

INVENTOR.
RALPH B. CARTER, JR.
BY
his ATTORNEY.

Patented June 24, 1947

2,422,656

UNITED STATES PATENT OFFICE 2,422,656

APPARATUS FOR EFFECTING CLARIFICATION OF TURBID LIQUIDS

Ralph B. Carter, Jr., Maywood, N. J., assignor to Ralph B. Carter Company, Hackensack, N. J., a corporation of New York Application July 14, 1944, Serial No. 544,932

7 Claims. (Cl. 259—4)

This invention relates to an apparatus for effecting clarification of turbid liquids wherein the use of a coagulant is provided and involving flocculation preparatory to sedimentation or filtration and has for its object to provide means to induce maximum floc amassment by continually changing inter-mixing flow paths.

The invention consists of a flocculation apparatus, according to which there is a general longitudinal liquid flow from an influent section at one portion of the tank or basin to an effluent discharge section at the other end portion of the tank to which the longitudinal flowing stream is caused to flow in a defined meandering path, which is intermittently changed to other defined meandering paths, causing highly efficient mingling of newly formed flocs to aid in creating, thru contact of said flocs each with the other the building up of large rapidly settleable flocs.

The longitudinal flow thru the tank or basin is controlled into a meandering stream by means of movable baffles, which in turn are actuated by outside motivating means, no agitating means being used.

In my invention there is no chance for floc settlement within the tank creating any septic condition, as the intermittently changing position of the baffles eliminates at each change the corners where the floc settles and the flow changes this corner section into a flow section thru which the liquid flows at a greater velocity than its velocity between the baffles, automatically and intermittently moving heavier settled flocs on into the next low velocity section of the tank where they are mingled with smaller flocs in the multitudinous eddy currents set up by the changing flow stream.

Also, in my invention short circuiting is prevented, as the changing flow stream caused by baffles extending across the tank and intermittently above the level of the liquid in the tank and to the bottom of the tank prevent any straight flow either across the surface of the liquid thru the tank or its sides or its bottom. The elimination of all paddle agitative means eliminates any possibility of floc disintegration thru contact with moving agitative paddles, thereby permitting the largest size flocs to form and the most rapid settling of this floc in the subsequent settling tank.

It has been found desirable, due to weather and temperature changes, to at times vary the velocity of the liquid undergoing treatment within the flocculation chamber in order to secure most effective floc amassment. This velocity variation can also be very readily accomplished in my invention.

The invention will be further described, embodiments thereof shown in the drawings, and will be finally set forth in the claims.

Similar characters of reference indicate corresponding parts.

Figure 1:
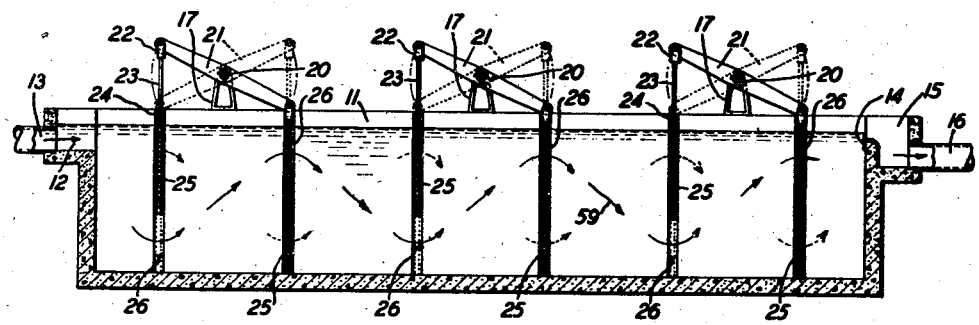
Fig. 1 is a vertical longitudinal section thru a coagulating tank provided with mechanism constructed in accordance with my invention.
Figure 2:
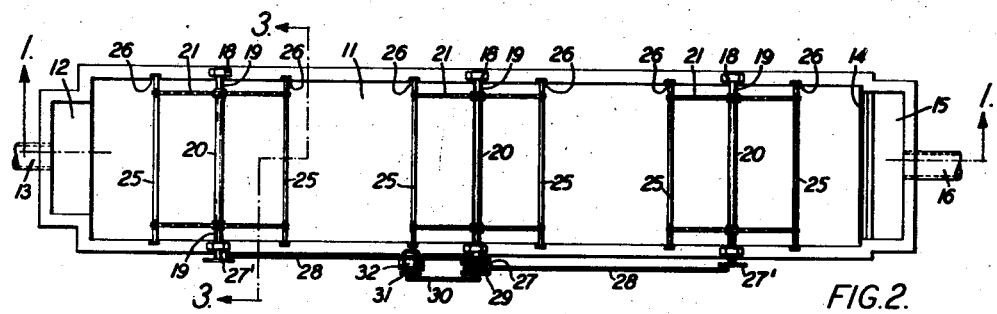
Fig. 2 is a plan view of the same tank and mechanism.
Figure 3:
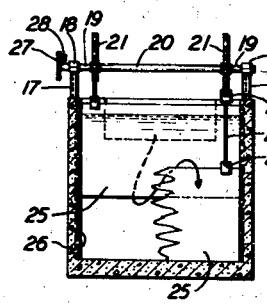
Fig. 3 is a vertical section taken thru line 3—3 of Fig. 2.
Figures 4, 5:
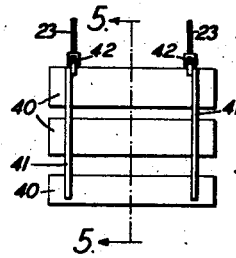
Figs. 4 and 5 are front and side views showing an alternate form of the movable baffle, and showing the baffles spaced from each other.

Referring to the drawings, a tank or coagulating basin 11 has an entrance end 12 supplied by pipe 13, through which liquid enters the tank. An adjustable or fixed weir 14 for maintaining a proper liquid level in the tank 11 is shown at the other end. An exit channel 15 and a pipe 16 is provided for the flow of the liquid from the tank.

Supporting stands or brackets 17 for bearing members 18 are provided in which shafts 20 oscillate. Arms or walking beams 21 are fastened to the shaft 20, and provide an oscillating movement for connecting rods 23 through flexible links 22. Movable vertical baffles 25 are suspended from the connecting rods 23 which baffles may or may not be guided by guide slots 26 in the side walls of the tanks, as flow conditions through the tank 11 demand. To operate all of the vertical baffles and do so successively alternatively, one form of mechanical linkage provides oscillating motion from a gear motor 32 with a crank or eccentric cam 31. The gear motor 32 causes the crank or eccentric cam 31 to impart an oscillating motion to the crank or cam 29 by rod 30. This motion of the crank 29 is in turn imparted to a crank 27, to which rods 28 are pivoted, which rods 28 operate cranks 27'. These cranks 27' and crank 27 are secured to the shafts 20, thus causing all shafts 20 to oscillate, which in turn through the walking beams 21 causes the movable baffles 25 to vertically raise and lower in the tank.

In Fig. 1 with vertical baffles as shown a meandering over and under flow of liquid is caused from the entrance 12 to the exit 15 as shown by the arrow line 59. As the liquid flows under and over the baffles through the open spaces, above or below the same, an eddying current is set up on the far side of each opening due to the relatively greater velocity of the liquid through said openings. As an example, the flow is about one foot a minute, and the baffles move about two or three strokes a minute.

This law of action provides a non-agitative mixture along the baffles conducive to the formation of larger settleable flocs through molecular attraction and permanent positioning of baffles. Such accumulations while sought, are moved along the tank longitudinally thereof by the meandering flow brought about by the positioning of the baffles, but changed on each stroke of the walking beam.

The opposite stroke is shown in Fig. 1 in dotted lines, which causes a directly opposite flow path. The flow over baffle becomes the flow under baffle. Thereafter the flow under baffle becomes the flow over baffle, and so on throughout the length of the flocculation chamber.

This change of flow path in place of the previous flow path sets up additional multitudinous eddies creating an ideal mixing condition and giving the floc within the chamber maximum opportunities for contacting with each other. Due to the absence of any agitating mechanism there is no tendency to break up flocs.

Figures 7, 8:
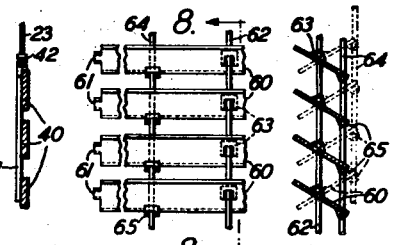
Fig. 7 is end front view.
Fig. 8 is a side view of another form of vertical baffle.
Figure 9:
Fig. 9 is a side view of the baffle operating mechanism shown in plan view in Fig. 2.

Another form of baffle is shown in Fig. 7 and Fig. 8, in which the baffles 60 have end projections 61 to enter the tank slots 20. Rods 62 support the baffles by hinges 63. An operating rod 64 pivoted at 65 to the baffles operates the baffles in the nature of a Venetian blind. The dotted line position in Fig. 8 shows the inclination opposite to that of the full line position. A meandering flow results with floc accumulation without agitation.

Figure 6:
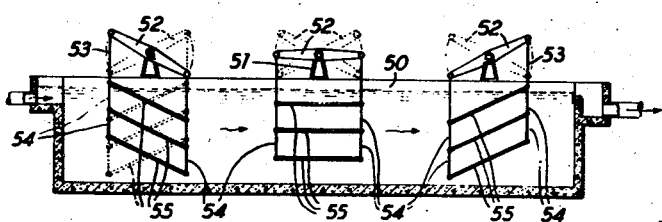
Fig. 6 is a longitudinal elevation of an alternate form of baffle, arranged in horizontal position instead of vertically.

In Figure 6 horizontal baffles are shown with actuating means to swing them into angular planes. Walking beams 52 hinged on standards 51, support vertical links 53, which support rods 54, which in turn support baffles 55.

The central baffles 55 are in horizontal position. The entrance end baffle is in an inclined position, the dotted lines showing the opposite position, and the exit end baffle is in the opposite position. A meandering flow results with the capacity of floc accumulation.

By decreasing the velocity of the flow over or under or through baffles at or near the exit end of the chamber, maximum flocs can be obtained or maintained at the exit. These velocities can be readily controlled by (1) varying the stroke of the walking beams, (2) by varying the height of the baffles, (3) and by using a perforated or spaced baffle construction.

Having described the invention and its characteristics in the form of an embodiment thereof, it is not desired to be limited thereto, save as the spirit thereof, is expressed in the following claims.

What I claim is:

1. In a flocculating apparatus having a tank or basin having an influent end and an effluent end substantially horizontally aligned for the horizontal flow of a coagulant-treated liquid from the influent end to the effluent end, the combination of a plurality of baffles longitudinally spaced within said tank in the path of said flow to accumulate flocs, the first of said longitudinally spaced baffles disposed to present a barrier to one part of the flow and diverting said flow in one direction and the next of said longitudinally spaced baffles disposed to present a barrier to said diverted flow and diverting said flow in another direction, the diverted flow being at an angle to the horizontal length of the tank, and the flow between two horizontally spaced adjacent baffles being at an angle to the flow between the next two longitudinally spaced adjacent baffles, and intermittently operating actuating means for the baffles to move the first baffle away from its initial floc accumulation position to the initial position of the second baffle, and to move the second baffle from its initial floc accumulation position to the initial position of the first baffle, whereby the floc accumulation during one position of a baffle is moved by the flow after the removal of its barrier action, and the new position of that baffle acts as a barrier for the accumulation of other flocs.

2. In a flocculating apparatus, the combination of claim 1, in which a plurality of guide grooves are vertically disposed and spaced longitudinally of said tank for the guidance of vertically disposed baffles.

3. In a flocculating apparatus, the combination of claim 1, in which said actuating means include common means operating each of the adjacent baffles forming a pair to raise one baffle and lower the other to change the position of each baffle of the pair from one floc accumulation position to another, and from one flow direction to the other.

4. In a flocculating apparatus, the combination of claim 1, in which said baffles are horizontally disposed, and means for moving said baffles from the horizontal to an inclined position.

5. In a flocculating apparatus, the combination of claim 1, in which said baffles are horizontally disposed, means at each end of each baffle for supporting the baffle in the flow, and common means for both of said ends for moving one end down and the other end up, and vice versa.

6. In a flocculating apparatus, the combination of claim 1, in which said baffles are vertically spaced from each other.

7. In a flocculating apparatus, the combination of claim 1, in which said baffles are arranged Venetian blind fashion, movable in various angular positions in respect to the flow.

RALPH B. CARTER, Jr.

REFERENCES CITED

The following references are of record in the file of this patent:

UNITED STATES PATENTS

| Number | Name | Date |
| --- | --- | --- |
| 272,959 | Hoyt | Feb. 27, 1883 |
| 384,568 | Evans | June 12, 1888 |
| 872,729 | Hiller | Dec. 3, 1907 |
| 1,129,453 | Childress | Feb. 23, 1915 |
| 1,577,365 | Ross | Mar. 16, 1926 |
| 2,321,965 | Zimmerman | June 15, 1943 |